(12) United States Patent
Castellano et al.

(10) Patent No.: US 7,759,280 B2
(45) Date of Patent: Jul. 20, 2010

(54) CATALYSTS, SYSTEMS AND METHODS TO REDUCE NOX IN AN EXHAUST GAS STREAM

(75) Inventors: Christopher R. Castellano, Ringoes, NJ (US); Ahmad Moini, Princeton, NJ (US); Gerald S. Koermer, Basking Ridge, NJ (US); Howard Furbeck, Hamilton, NJ (US)

(73) Assignee: BASF Corporation, Florham Park, NJ (US)

( * ) Notice: Subject to any disclaimer, the term of this patent is extended or adjusted under 35 U.S.C. 154(b) by 144 days.

(21) Appl. No.: 11/533,631

(22) Filed: Sep. 20, 2006

(65) Prior Publication Data
US 2008/0069743 A1 Mar. 20, 2008

(51) Int. Cl.
*B01J 23/00* (2006.01)
(52) U.S. Cl. .................................... 502/305
(58) Field of Classification Search ............... 422/168, 422/177, 180; 520/305, 317, 415
See application file for complete search history.

(56) References Cited

U.S. PATENT DOCUMENTS

| | | | |
|---|---|---|---|
| 3,953,368 A | 4/1976 | Sinfelt | |
| 4,229,319 A | 10/1980 | Antos | |
| 4,322,458 A * | 3/1982 | Siebmanns | 427/453 |
| 4,341,664 A | 7/1982 | Antos | |
| 4,536,482 A | 8/1985 | Carcia | |
| 4,539,308 A | 9/1985 | Kukes et al. | |
| 5,489,565 A | 2/1996 | Cheung et al. | |
| 5,593,933 A | 1/1997 | Chattha | |
| 5,744,112 A | 4/1998 | Irite et al. | |
| 5,880,196 A | 3/1999 | Cho et al. | |
| 5,977,012 A | 11/1999 | Kharas et al. | |
| 6,074,973 A | 6/2000 | Lampert et al. | |
| 6,153,162 A | 11/2000 | Fetzer et al. | |
| 6,176,079 B1 | 1/2001 | Konrad et al. | |
| 2005/0085380 A1* | 4/2005 | Lockemeyer | 502/243 |
| 2005/0137083 A1 | 6/2005 | Rocha | |
| 2008/0069741 A1 | 3/2008 | Koermer et al. | |
| 2008/0070778 A1 | 3/2008 | Castellano et al. | |

FOREIGN PATENT DOCUMENTS

EP 0070736 1/1983

(Continued)

OTHER PUBLICATIONS

"International Search Report PCT/US2007/078992 mailed Feb. 15, 2008".

(Continued)

*Primary Examiner*—Tom Duong
(74) *Attorney, Agent, or Firm*—Scott S. Servilla; Diehl Servilla LLC; Melanie L. Brown

(57) ABSTRACT

Catalysts, systems and methods are described to reduce $NO_x$ emissions of an internal combustion engine. In one embodiment, an emissions treatment system for an exhaust stream is provided having an SCR catalyst comprising silver tungstate on an alumina support. The emissions treatment system may be used for the treatment of exhaust streams from diesel engines and lean burn gasoline engines. An emissions treatment system may further comprise an injection device operative to dispense a hydrocarbon reducing agent upstream of the catalyst.

14 Claims, 4 Drawing Sheets

FOREIGN PATENT DOCUMENTS

| EP | 0070736 A | | 1/1983 |
|---|---|---|---|
| EP | 0667182 | | 8/1995 |
| EP | 0667182 A | | 8/1995 |
| WO | WO 97/22476 | | 6/1997 |
| WO | WO0112320 | * | 2/2001 |

OTHER PUBLICATIONS

Nakatsuji, et al., "Catalytic Reduction System of NOx in exhaust gases from diesel engines with secondary fuel injection", *Applied Catalysis, B Environmental* (1998) 17(4), 333-345.

Takagi, et al., "Selective reduction of NO on Ag/Al2O3 catalysts prepared from boehmite needles", *Catalysis Today 43* (1998), 123-127.

IPRP and Written Opinion in PCT/US2007/078992, dated Apr. 2, 2009, 9 pp.

"USPTO Non-Final Office Action mailed Apr. 3, 2009", U.S. Appl. No. 11/533,593, (Apr. 3, 2009), 10 pages.

"USPTO Final Office Action mailed Oct. 15, 2009", U.S. Appl. No. 11/533,593, (Oct. 15, 2009), 11 pages.

* cited by examiner

CATALYSTS, SYSTEMS AND METHODS TO REDUCE NOX IN AN EXHAUST GAS STREAM

GOVERNMENT CONTRACT RIGHTS

The U.S. Government has a paid-up license in this invention and the right in limited circumstances to require the patent owner to license others on reasonable terms as provided for by the terms of DE-FC26-02NT41218 awarded by the U.S. Department of Energy.

TECHNICAL FIELD

This invention pertains generally to exhaust emissions treatment systems and catalysts for internal combustion engines and methods for their manufacture and use with lean burn engines, including diesel engines and lean burn gasoline engines.

BACKGROUND OF THE INVENTION

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their durability, and their ability to generate high torque at low speed. However, exhaust from lean burn gasoline engines is characterized by relatively high emissions of $NO_x$ as compared to conventional gasoline engines that operate at or close to stoichiometric air/fuel conditions. Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions.

Efficient reduction of nitrogen oxides ($NO_x$=$NO$+$NO_2$) from diesel and lean-burn gasoline exhaust is important to meet future emission standards and improve vehicle fuel economy. Reduction of $NO_x$ emissions from an exhaust feedstream containing excess oxygen to meet various regulatory requirements is a challenge for vehicle manufacturers. For example, it is estimated that compliance with Bin 5 regulations in the United States may require an aftertreatment system capable of 70-90% $NO_x$ conversion efficiency on the FTP (Federal Test Procedure) cycle based on currently anticipated engine-out $NO_x$ levels. One such strategy for the abatement of $NO_x$ in the exhaust stream from lean burn engines uses $NO_x$ storage reduction (NSR) catalysts, which are also known in the art as "$NO_x$ traps." NSR catalysts contain $NO_x$ sorbent materials capable of adsorbing or "trapping" oxides of nitrogen under lean conditions and platinum group metal components to provide the catalyst with oxidation and reduction functions. In operation, the NSR catalyst promotes a series of elementary steps which are depicted below in Equations 1-5. In an oxidizing environment, NO is oxidized to $NO_2$ (Equation 1), which is an important step for $NO_x$ storage. At low temperatures, this reaction is typically catalyzed by the platinum group metal component, e.g., a platinum component. The oxidation process does not stop here. Further oxidation of $NO_2$ to nitrate, with incorporation of an atomic oxygen, is also a catalyzed reaction (Equation 2). There is little nitrate formation in absence of the platinum group metal component even when $NO_2$ is used as the $NO_x$ source. The platinum group metal component has the dual functions of oxidation and reduction. For its reduction role, the platinum group metal component first catalyzes the release of $NO_x$ upon introduction of a reductant, e.g., CO (carbon monoxide) or HC (hydrocarbon) (Equation 3) to the exhaust. This step may recover some $NO_x$ storage sites but does not contribute to any reduction of $NO_x$ species. The released $NO_x$ is then further reduced to gaseous $N_2$ in a rich environment (Equations 4 and 5). $NO_x$ release can be induced by fuel injection even in a net oxidizing environment. However, the efficient reduction of released $NO_x$ by CO requires rich conditions. A temperature surge can also trigger $NO_x$ release because metal nitrate is less stable at higher temperatures. $NO_x$ trap catalysis is a cyclic operation. Metal compounds are believed to undergo a carbonate/nitrate conversion, as a dominant path, during lean/rich operations.

Oxidation of NO to $NO_2$ $$NO + 1/2 O_2 \rightarrow NO_2 \quad (1)$$

$NO_x$ Storage as Nitrate $$2NO_2 + MCO_3 + 1/2 O_2 \rightarrow M(NO_3)_2 + CO_2 \quad (2)$$

$NO_x$ Release $$M(NO_3)_2 + 2CO \rightarrow MCO_3 + NO_2 + NO + CO_2 \quad (3)$$

$NO_x$ Reduction to $N_2$ $$NO_2 + CO \rightarrow NO + CO_2 \quad (4)$$

$$2NO + 2CO \rightarrow N_2 + 2CO_2 \quad (5)$$

In Equations 2 and 3, M represents a divalent metal cation. M can also be a monovalent or trivalent metal compound in which case the equations need to be rebalanced.

While the reduction of NO and $NO_2$ to $N_2$ occurs in the presence of the NSR catalyst during the rich period, it has been observed that ammonia ($NH_3$) can also form as a by-product of a rich pulse regeneration of the NSR catalyst. For example, the reduction of NO with CO and $H_2O$ is shown below in equation (6).

Reduction of NO to $NH_3$ $$2NO + 5CO + 3H_2O \rightarrow 2NH_3 + 5CO_2 \quad (6)$$

This property of the NSR catalyst mandates that $NH_3$, which is itself a noxious component, must also now be converted to an innocuous species before the exhaust is vented to the atmosphere.

An alternative strategy for the abatement of $NO_x$ under development of mobile applications (including treating exhaust from lean burn engines) uses selective catalytic reduction (SCR) catalyst technology. The strategy has been proven effective as applied to stationary sources, e.g., treatment of flue gases. In this strategy, $NO_x$ is reduced with a reductant, e.g., $NH_3$, to nitrogen ($N_2$) over an SCR catalyst that is typically composed of base metals. This technology is capable of $NO_x$ reduction greater than 90%, thus it represents one of the best approaches for achieving aggressive $NO_x$ reduction goals.

Ammonia is one of the most effective reductants for $NO_x$ at lean condition using SCR technologies. One of the approaches being investigated for abating $NO_x$ in diesel engines (mostly heavy duty diesel vehicles) utilizes urea as a reductant. Urea, which upon hydrolysis produces ammonia, is injected into the exhaust in front of an SCR catalyst in the temperature range 200-600° C. One of the major disadvantages for this technology is the need for an extra large reservoir to house the urea on board the vehicle. Another significant concern is the commitment of operators of these vehicles to replenish the reservoirs with urea as needed, and the requirement of an infrastructure for supplying urea to the operators. Therefore, less burdensome and alternative sources for supplying the reductant $NH_3$ for the SCR treatment of exhaust gases are desirable.

Emissions treatment systems that utilize the catalytic reduction of $NO_x$ in the exhaust to generate $NH_3$, in place of an external reservoir of $NH_3$ or $NH_3$ precursor are known in the art. In other words, a portion of the $NO_x$ component of the exhaust is used as an $NH_3$ precursor in such systems. For instance, U.S. Pat. No. 6,176,079 discloses a method for treating an exhaust gas from a combustion system that is operated alternately in lean and rich conditions. In the method, nitrogen oxides are intermediately stored during lean operation, and released during rich operation to form $NH_3$ that is stored. The stored $NH_3$ can be released, and thereby reduce nitrogen oxides during a subsequent lean operation.

Selective catalytic reduction of $NO_x$ using hydrocarbons (HC—SCR) has been studied extensively as a potential alternative method for the removal of $NO_x$ under oxygen-rich conditions. Ion-exchanged base metal zeolite catalysts (e.g., Cu-ZSM5) have typically not been sufficiently active under typical vehicle operating conditions, and are susceptible to degradation by sulfur dioxide and water exposure. Catalysts employing platinum-group metals (e.g., $Pt/Al_2O_3$) operate effectively over a narrow temperature window and are highly selective towards $N_2O$ production.

Catalytic devices using alumina-supported silver (Ag/$Al_2O_3$) have received attention because of their ability to selectively reduce $NO_x$ under lean exhaust conditions with a wide variety of hydrocarbon species. In addition, diesel fuel could be supplied as a reductant. Diesel fuel does not require additional tanks for diesel-powered vehicles. The diesel fuel can be to the emissions system by changing engine management or by supplying an additional injector of diesel fuel to the emission train.

Despite these various alternatives, there is no practical hydrocarbon SCR catalyst. Therefore, there is a need for an effective method and apparatus to selectively reduce $NO_x$ in an exhaust gas stream for vehicles and other applications of lean-burn internal combustion engines.

SUMMARY OF THE INVENTION

In accordance with an embodiment of the invention, a catalyst for reducing $NO_x$ emissions from an exhaust gas stream of a lean burn engine is provided comprising silver tungstate on an alumina support. In a particular embodiment, the catalyst is manufactured by impregnation of silver tungstate on a hydroxylated alumina. The silver tungstate comprises the stoichiometric compound $Ag_2WO_4$ or multiples thereof.

According to one or more embodiments, the alumina is selected from boehmite, pseudo boehmite or gelatinous boehmite, diaspore, nordstrandite, bayerite, gibbsite, alumina having hydroxyl groups added to the surface, and mixtures thereof. Another aspect of the invention pertains to emissions treatment system for an exhaust stream comprising a catalyst comprising silver tungstate on an alumina support. In one embodiment, the system further comprises a controller to periodically lower the air/fuel ratio in the exhaust stream upstream of the catalyst. In one embodiment, the controller comprises an injector that periodically meters a reducing agent selected from at least one of a hydrocarbon fuel, pure hydrocarbons, carbon monoxide and hydrogen into the exhaust stream upstream of the catalyst to form a rich gaseous stream.

In one or more embodiments, the catalyst is disposed on a ceramic or metallic honeycomb flow through substrate. According to one or more embodiments, the system includes a second catalyst disposed on a second ceramic or metallic honeycomb flow through substrate.

The emissions treatment system may, according to one or more embodiments, further comprise a component selected from diesel oxidation catalyst, a catalyzed soot filter, a soot filter, a $NO_x$ trap, partial hydrocarbon oxidation catalyst, a sulfur trap, a precious metal catalyst disposed on a substrate, a phosphorous trap, and combinations or one or more thereof.

According to one or more embodiments, the catalyst is disposed on a soot filter and functions as a hydrocarbon SCR catalyst. The soot filter may be a wall flow filter. In one embodiment, the soot filter is a wall flow filter comprising an inlet end, an outlet end and internal walls extending from the inlet end to the outlet end and defining a plurality of passages comprising inlet channel sides and outlet channel sides with alternate channels comprising inlet channels having open inlets and plugged outlets and outlet channels having open outlets and plugged inlets, wherein the catalyst is disposed on the outlet channel side.

In one or more embodiments, the emissions treatment system further comprises an NSR catalyst which extends from the inlet end for at least part of the distance from the open inlet toward the plugged outlet, and the SCR catalyst extends from the outlet end for at least part of the distance from the open outlet toward the plugged outlet. According to one embodiment, there is an inlet oxidation catalyst disposed as a layer on part of the NSR catalyst and extends from the inlet end for at least part of the distance from the open inlet toward the plugged outlet, and/or there is an outlet oxidation catalyst disposed as a layer on part of the SCR catalyst and extends from the outlet end for at least part of the distance from the open outlet toward the plugged outlet.

Another aspect of the invention pertains to a method for converting $NO_x$ in an exhaust gas from a diesel engine or lean burn gasoline engine to $N_2$, comprising contacting the exhaust gas from a diesel engine or lean burn gasoline with a catalyst comprising silver tungstate on an alumina support. The method may further include injecting a reducing agent selected from the group consisting of at least one of a hydrocarbon fuel, dodecane, m-xylene, carbon monoxide and hydrogen into the exhaust stream upstream of the catalyst to form a rich gaseous stream.

Another aspect of the invention pertains to a method of preparing a catalyst comprising providing a support comprising alumina; impregnating the support with silver tungstate; and calcining the impregnated support. In a specific embodiment, a method of preparing a catalyst comprises providing a support comprising surface hydroxylated alumina; impregnating the support with a silver compound; drying the impregnated support; calcining the impregnated support; and subjecting the resulting material to hydrothermal treatment. In one embodiment, the method further comprises dissolving silver tungstate in an ammonium hydroxide solution and impregnating the alumina in the solution. In one or more embodiments, the method may further comprise hydrothermally treating the impregnated support in 10% steam at a temperature ranging from 400° C. to 700° C., preferably at about 650° C., for 1 to 48 hours.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION OF EMBODIMENTS OF THE INVENTION

Figure 1:
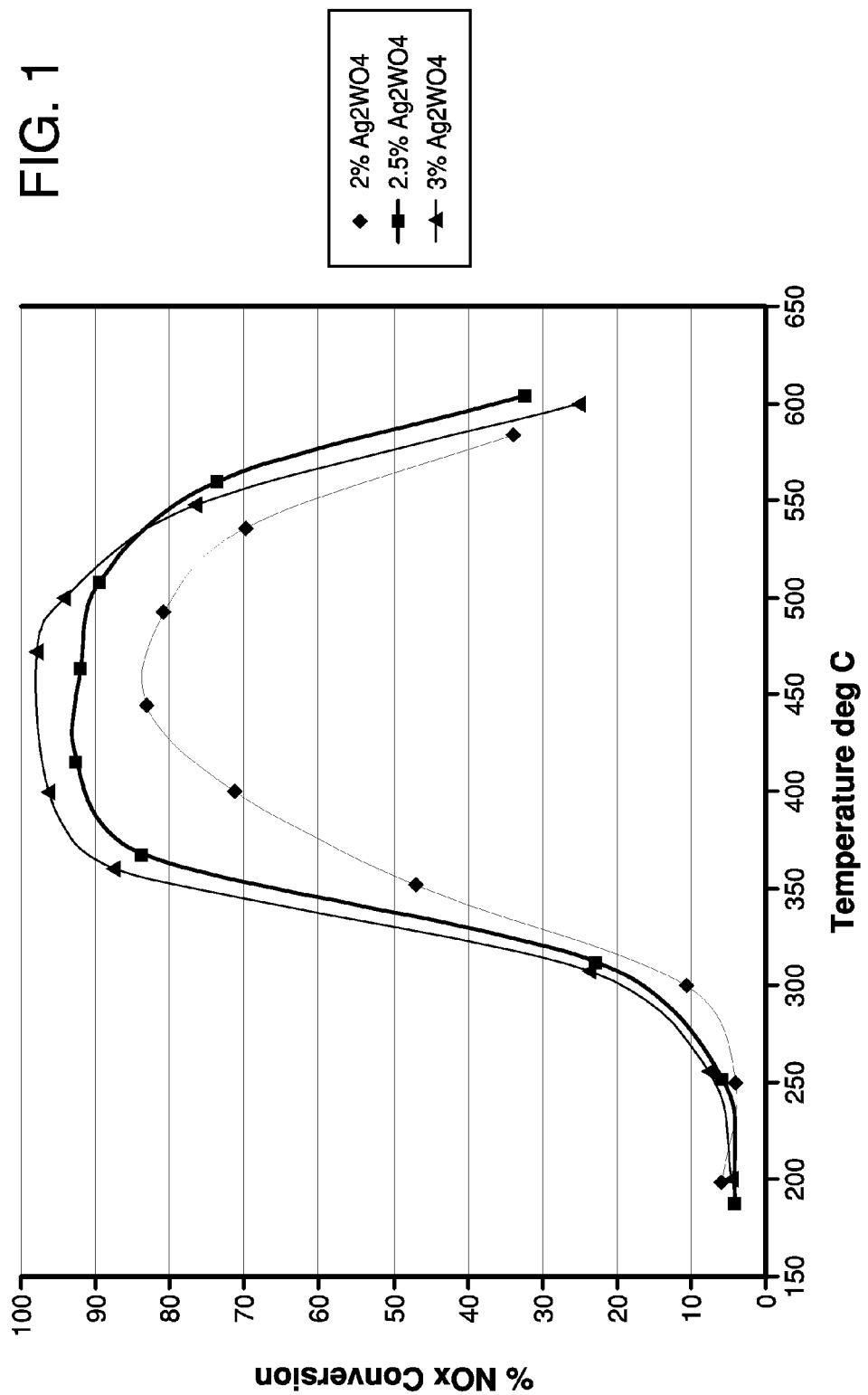
FIG. 1 is a graph showing a plot of NOx conversion versus temperature for silver tungstate samples.

Before describing several exemplary embodiments of the invention, it is to be understood that the invention is not limited to the details of construction or process steps set forth in the following description. The invention is capable of other embodiments and of being practiced in various ways.

An exemplary silver tungstate alumina catalyst comprises alumina comprising between about 1 to 10 wt. % silver tungstate supported on alumina. Certain of the catalysts tested in the Examples below were supported on a 400 cell per square inch cordierite monolith substrate. The catalyst was hydrothermally aged employing air and about 10% water at about 650° C. for at least about 1 hour, typically about 16 hours prior to testing. Thus, according to one or more embodiments, a catalyst for reducing NOx emissions from an exhaust gas stream of a lean burn engine is provided which comprises silver tungstate on an alumina support.

Preparation of Catalyst Compositions

One aspect of the invention pertains to methods of preparing catalysts and catalyst compositions. Thus, an alumina support is impregnated with silver tungstate as described below.

According to one or more embodiments, a surface hydroxylated alumina support is used as the support. As used herein, the term "hydroxylated" means that the surface of the alumina has a high concentration of surface hydroxyl groups in the alumina as it is obtained, for example boehmite, pseudoboehmite or gelatinous boehmite, diaspore, nordstrandite, bayerite, and gibbsite. Pseudoboehmite and gelatinous boehmite are generally classified as non-crystalline or gelatinous materials, whereas diaspore, nordstrandite, bayerite, gibbsite, and boehmite are generally classified as crystalline. According to one or more embodiments of the invention, the hydroxylated alumina is represented by the formula Al(OH)$_x$O$_y$, where x=3−2y and y=0 to 1 or fractions thereof. In their preparation, such aluminas are not subject to high temperature calcination, which would drive off many or most of the surface hydroxyl groups.

According to embodiments of the present invention, substantially non-crystalline hydroxylated aluminas in the form of flat, plate-shaped particles, as opposed to needle-shaped particles, are useful in preparing catalysts. The shape of the hydroxylated alumina used in one or more embodiments of the present invention is in the form of a flat plate and has an average aspect ratio of 3 to 100 and a slenderness ratio of a flat plate surface of 0.3 to 1.0. The aspect ratio is expressed by a ratio of "diameter" to "thickness" of a particle. The term "diameter" as used herein means a diameter of a circle having an area equal to a projected area of the particle, which has been obtained by observing the alumina hydrate through a microscope or a Transmission Electron Microscope (TEM). The slenderness ratio means a ratio of a minimum diameter to a maximum diameter of the flat plate surface when observed in the same manner as in the aspect ratio.

Hydroxylated, flat, plate-shaped particulate aluminas which may be used in producing the catalysts according to embodiments of the invention are known and commercially available. Processes for producing them are also known. Exemplary processes for producing pseudoboehmite are described in, for example, U.S. Pat. No. 5,880,196 and PCT International Application No. WO 97/22476.

Pseudoboehmite has a boehmite-like structure. The X-ray diffraction pattern, however, consists of very diffuse bands or halos. The spacings of the broad reflections correspond approximately with the spacings of the principal lines of the pattern of crystalline boehmite, but the first reflection, in particular, commonly shows appreciable displacements to values as large as 0.66 to 0.67 nanometer compared with the 0.611 nanometer reflection for the 020 line for boehmite. It has been suggested that although the structure resembles that of boehmite in certain respects, the order is only of very short range. It is generally accepted by those skilled in the art that pseudoboehmite is a distinct phase which is different from boehmite. See Encyclopedia of Chemical Technology, 5$^{th}$ Ed., Vol. 2, Wiley Inter science, 2004, pages 421-433, and "Oxides and Hydroxides of Aluminum," Alcoa Technical Paper No. 19, Revised, by Karl Wefers and Chanakya Misra, 1987, Copyright Aluminum Company of America.

Alternatively, a calcined alumina could be treated in a manner to add surface hydroxyl groups, for example, by exposing the alumina to steam for a period of time. In one or more embodiments, the alumina used for silver impregnation is substantially free of gamma alumina. The final catalyst after silver impregnation, drying, calcination, and/or hydrothermal treatment, may comprise gamma alumina or other high temperature alumina phases.

In one or more embodiments, the alumina is impregnated with a solution containing silver tungstate. The silver tungstate catalysts have significant HC SCR activity for the treatment of emissions from lean burn engines. The stoichiometric compound $Ag_2WO_4$ (or multiples thereof) supported on an alumina such as gamma alumina, boehmite or pseudoboehmite or mixtures thereof effectively converts $NO_x$ to $N_2$ in the presence of a hydrocarbon reducing agent. Compared to a silver on an alumina catalyst, similar conversions of $NO_x$ are obtained with approximately one half the net silver loading. The 2% silver tungstate on alumina catalyst gives similar NOx conversion as 2% silver (as $Ag_2O$) on the same alumina, although the silver ($Ag_2O$) loading for the silver tungstate catalyst is only one half that of silver only catalyst.

The silver tungstate catalyst can be made by dissolving commercially available silver tungstate in an ammonium hydroxide solution and impregnating the alumina to the desired silver tungstate level. The resulting material is then dried and calcined to a temperature of about 540° C. The material may then be heated in 10% steam at 650° C. It has been found that silver tungstate catalysts provide high conversions over a broad temperature range of about 275° C. to 525° C.

The deposition of silver onto the surface of alumina can be achieved by various impregnation methods, including incipient wetness and wet impregnation. In the wet impregnation process, an excess amount of solution is mixed with the support, followed by evaporation of the excess liquid. The deposition of silver can also be achieved by other coating techniques such as chemical vapor deposition.

Emissions Treatment Systems

The emission treatment systems according to one or more embodiments of the invention may include the silver tungstate on an alumina support $NO_x$ reduction catalyst described above and various other components. Thus, the silver tungstate on an alumina support catalyst may be contained on multiple monoliths or substrates with one or more of the substrates containing in part or entirely the silver tungstate on an alumina support catalyst. The silver tungstate on an alumina support catalyst may be part of a hydrocarbon SCR(HC SCR) system where the hydrocarbons are supplied by engine controls or engine management. Alternatively, the silver tungstate on an alumina support catalyst may be part of an HC SCR system in which the hydrocarbons are supplied by a separate injection device. In another embodiment, an HC SCR system can have hydrogen added to the exhaust system, for example using a $PO_x$ reactor, an on board supply of hydrogen, or by using compounds or complexes that release hydrogen when they are decomposed. An HC SCR system may be provided in which 1% or more of the reductant contains an oxygenated carbon-containing molecule such as an aldehyde, alcohol or carbon monoxide. The $NO_x$ catalysts described above may be part of a system that includes one or more additional components of an exhaust system including, but not limited to diesel oxidation catalysts, catalyzed soot filters, soot filters, $NO_x$ traps, NSR catalysts, partial hydrocarbon oxidation catalysts, air pumps, external heating devices, precious metal catalysts, sulfur traps, phosphorous traps, etc.

The emissions treatment system can include the silver tungstate on an alumina support catalyst described above to treat $NO_x$. silver tungstate on an alumina support catalyst can be located downstream of an NSR catalyst. The silver tungstate on an alumina support catalyst can be in the form of self-supporting catalyst particles or as a honeycomb monolith formed of the SCR catalyst composition. In one or more embodiments, the silver tungstate on an alumina support catalyst composition is disposed as a washcoat or as a combination of washcoats on a ceramic or metallic substrate, preferably a honeycomb flow through substrate.

According to one or more embodiments, when deposited on the honeycomb monolith substrates, such silver tungstate on an alumina support catalyst compositions are deposited at a concentration of at least 1 $g/in^3$ to ensure that the desired $NO_x$ reduction is achieved and to secure adequate durability of the catalyst over extended use. In one embodiment, there is at least 1.6 $g/in^3$ of SCR composition, and in particular, there is at least 1.6 to about 4.0 $g/in^3$ of the SCR composition disposed on the monolith.

Substrates

In one or more embodiments, one or more catalyst compositions are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). Either NSR and/or SCR catalyst composition can be coated on the wall-flow filter. If such substrate is utilized, the resulting system will be able to remove particulate matters along with gaseous pollutants. The wall-flow filter substrate can be made from materials commonly known in the art, such as cordierite or silicon carbide.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, one or more catalyst compositions may be deposited on an open cell foam substrate. Such substrates are well known in the art, and are typically formed of refractory ceramic or metallic materials.

Preparation of Washcoats

The catalyst compositions of the present invention may be readily prepared by processes well known in the prior art. A representative process for preparing a bi-layer washcoat set forth below. It will be understood that the process below can be varied according to different embodiments of the invention to prepare single layer washcoats, by omitting the step of applying the second layer, or to add one or more additional layers to the bi-layer washcoat described below.

The catalyst composite can be readily prepared in one or more layers on a monolithic honeycomb substrate. For a bi-layer washcoat, the bottom layer, finely divided particles of a high surface area refractory metal oxide such as gamma alumina are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide. Components such as the silver metals, precious metals or platinum group metals, transition metal oxides, stabilizers, promoters and the $NO_x$ sorbent component may be incorporated in the slurry as a mixture of water soluble or water-dispersible compounds or complexes. Thereafter, the coated substrate is typically calcined by heating, e.g., at 400 to 600° C. for 1 to 3 hours.

In one or more embodiments, the slurry is comminuted to result in substantially all of the solids having particle sizes of less than 20 microns, i.e., 1-15 microns, in an average diameter. The comminution may be conducted in a ball mill or other similar equipment, and the solids content of the slurry may be, e.g., 20-60 wt. %, preferably 35-45 wt. %.

Each layer thereafter prepared and deposited on the previously formed layer of the calcined composite in a manner similar to that described above. After all coating operations have been completed, the composite is then again calcined by heating, e.g., at 400 to 600° C. for 1-3 hours.

The following examples further illustrate the present invention, but of course, should not be construed as in any way limiting its scope.

EXAMPLES

Catalyst Preparation

Impregnation Procedure

The available pore volume of the alumina support was determined by titrating the bare support with water, while mixing, until incipient wetness was achieved. This resulted in a liquid volume per gram of support. Using the final target metal level and the available volume per gram of support, the amount of solution needed is calculated. Deionized (DI) water is added to the silver tungstate solution, if needed, so that the total volume of liquid is equal to amount needed to impregnate the support sample to incipient wetness. If the amount of solution needed exceeds the pore volume of the support, then multiple impregnations are done. The appropriate volume of solution is added slowly to the support with mixing. After incipient wetness is achieved, the resulting solid is dried at about 90° C. for about 16 hours, then calcined at about 540° C. for about 2 hours. The catalyst is also optionally subjected to a flowing stream of about 10% steam in air for at least about 1 hour, typically about 16 hours at 650° C.

Preparation of $Ag_2WO_4$ Catalysts

Silver tungstate was purchased from Aldrich Chemical Company or Alfa Aesar. A solution of 0.3M $Ag_2WO_4$ was prepared using deionized water and enough concentrated ammonium hydroxide to facilitate dissolution of the silver tungstate after stirring for about 0.5-16 hours. This solution was used to impregnate the support to the appropriate level. Using the final target $Ag_2WO_4$ level and the available volume per gram of support, the amount of $Ag_2WO_4$ solution needed is calculated. DI water is added to the silver solution, if needed, so that the total volume of liquid is equal to amount needed to impregnate the support sample to incipient wetness. If the amount of $Ag_2WO_4$ solution needed exceeds the pore volume of the support, then multiple impregnations are done.

After incipient wetness is achieved, the resulting solid is dried at about 90° C. for about 16 h, then calcined at about 540° C. for about 2 hours. The catalyst is then subjected to a flowing stream of about 10% steam in air for about 16 hours at about 650° C.

A raman spectrum of the purchased silver tungstate shows a peak at 881 $cm^{-1}$. Raman analysis of the support prior to impregnation shows no peak at that location. Raman analysis of a catalyst formed by impregnation and calcined at 550° C. for 2 hours shows an identical band as the pure silver tungstate. Thus the tungstate survives catalyst preparation intact. No other bands except those due to the silver tungstate or support were present.

Preparation of 2% Ag2O on Alumina Catalyst

A 1M solution of silver nitrate was prepared using deionized water. The resulting solution was stored in a dark bottle away from light sources. Using the final target $Ag_2O$ level and the available volume per gram of support, the amount of 1M $AgNO_3$ solution needed is calculated. DI water is added to the silver solution, if needed, so that the total volume of liquid is equal to amount needed to impregnate the support sample to incipient wetness. If the amount of $AgNO_3$ solution needed exceeds the pore volume of the support, then multiple impregnations are done. The resulting solid is dried at 90° C. for 16 h, then calcined at 540° C. for 2 hours. The catalyst is also optionally subjected to a flowing stream of about 10% steam in air for about 16 hours at 650° C.

Catalyst Evaluation

Catalyst performance was evaluated in two ways. The first option involves using a microchannel catalytic reactor containing a bed of approximately 12.6 $mm^3$ of catalyst. The flow rate (standard temperature and pressure) of 15 sccm of reactants (at the concentration shown in Table 1, below) plus 0.75 sccm steam was passed over the bed at various temperatures (150, 175, 200, 225, 250, 300, 350, 400, 500° C.) to determine the reactivity of the catalyst. Conversion of $NO_x$ was determined by $100*(NO_x\ fed-NO_x out)/(NO_x\ fed)$ using a mass spectral analyzer. n-Octane was used as the hydrocarbon reductant.

TABLE 1

| Species | Concentration |
|---|---|
| $NO_x$ | 400 ppm |
| $O_2$ | 10% |
| $CO_2$ | 5% |
| HC (C1) | 4000 ppm |
| C1/N | 10 |
| CO | 745 ppm |
| $H_2$ | 245 ppm |
| He | balance |
| $H_2O$ as % of dry Air flow | 5% |

Catalyst was also evaluated by washcoating the catalyst powder onto a small cylindrical cordierite monolith (¾" diameter×1.0" length) of 400 cells/$in^3$ by dip-coating the monolith into an aqueous slurry of the catalyst using well known, standard techniques. Final catalyst loading was typically 2.5-3.0 g/$in^3$. Catalysts are compared in the examples below at similar loadings and equivalent space velocities.

Analysis of the performance of these samples was accomplished by using a tubular flow through reactor. A simulated exhaust gas feedstream was passed through a sample of the Ag tungstate catalyst on 400 cell-per-square inch cordierite monolith substrate, using simulated diesel fuel. The reactor system was instrumented with appropriate sensors, including a Fourier transform infrared spectrometer to determine $NO_x$ concentration levels (and other species) entering/exiting the SCR catalyst, and a flow meter to determine exhaust flow rate translatable to catalyst space velocity (SV). Space velocity represents a rate of feed of gas, in volume, per unit volume of the catalyst, and has a unit of inverse hour ($h^{-1}$). Baseline laboratory conditions included the following standard gases in the simulated exhaust feedstream: 10% $O_2$, 5% $CO_2$, 5% $H_2O$, 750 parts per million (hereinafter 'ppm') CO, and 250 ppm $H_2$. n-Octane was used as the hydrocarbon reductant in all laboratory reactor work. (33 vol. %, aromatic).

Example 1

Comparison of $Ag_2WO_4$ Catalyst to $Ag_2O$ Catalyst Using Monoliths

The following table indicates the catalysts that were prepared using a commercial pseudoboehmite starting material support. The resulting catalysts are washcoated onto monoliths and tested in the tubular reactor as described above.

| Sample | Description | Wt % as $Ag_2O$ | Wt % as Ag | Loading g/in³ |
|---|---|---|---|---|
| A | 2% $Ag_2O$ | 2 | 1.86 | 2.7 |
| B | 2% $Ag_2WO_4$ | 1 | 0.93 | 2.2 |
| C | 2.5% $Ag_2WO_4$ | 1.25 | 1.16 | 2.2 |
| D | 3.0% $Ag_2WO_4$ | 1.50 | 1.40 | 2.2 |

From this table it is clear that the silver only catalyst (A) has significantly more silver than any of the silver tungstate samples (B, C, and D). In addition, the loading is higher for catalyst A. Thus there is more catalyst available for A compared to the silver tungstate examples (B, C, and D).

The results of the catalyst testing are shown in FIG. 1, which shows a plot of $NO_x$ conversion vs temperature for the three silver tungstate samples. Clearly all three catalysts give good NOx conversion in the temperature range of approximately 350 to 600° C.

Figure 2:
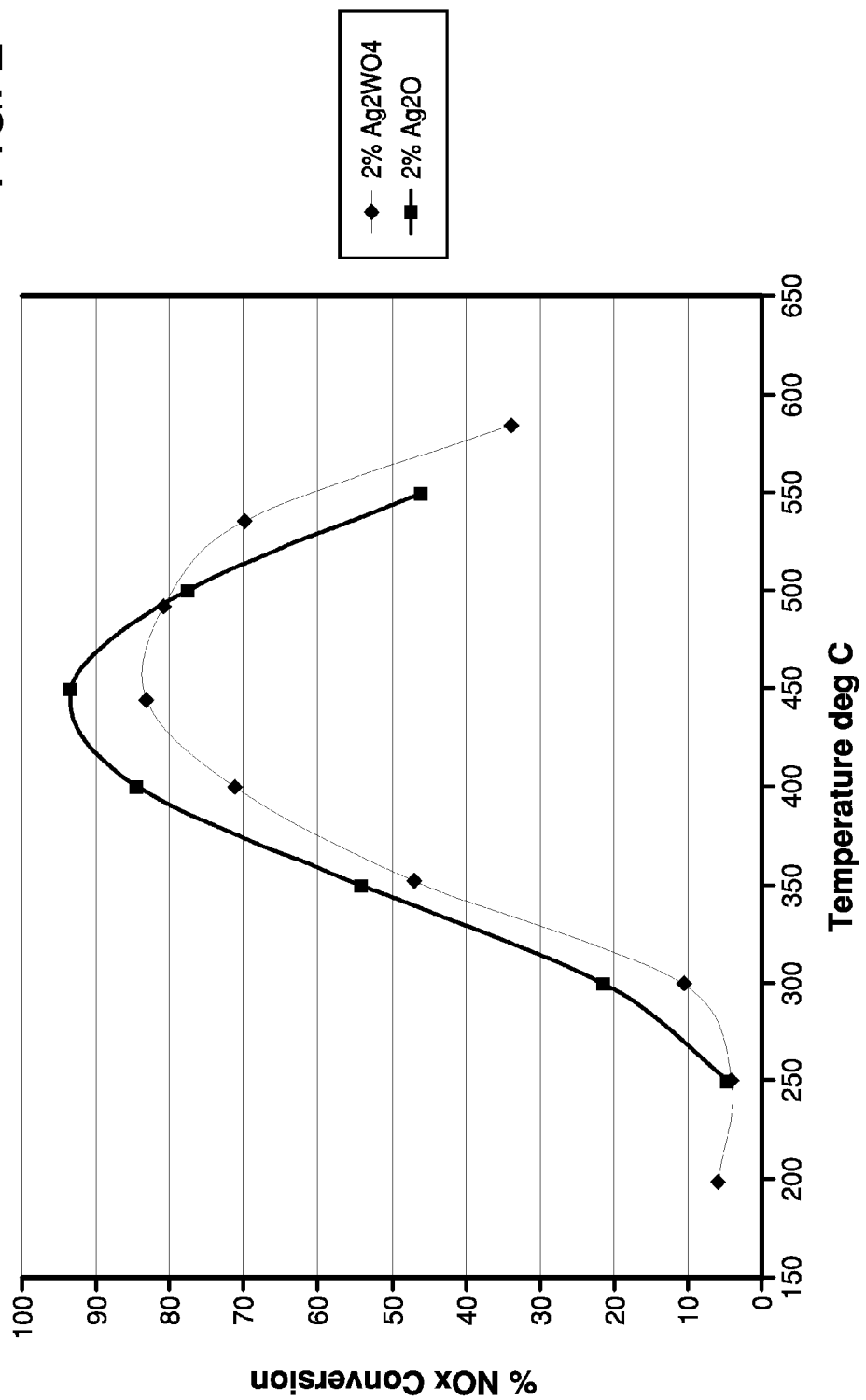
FIG. 2 is a graph comparing NOx conversion of a silver catalyst to a silver tungstate catalyst.

FIG. 2 compares the 2% $Ag_2O$ catalyst to the 2% $Ag_2WO_4$ catalyst. The silver content for the $Ag_2WO_4$ catalyst is one half that of the silver catalyst. As shown in FIG. 2, it is clear that the conversions are similar despite the difference in silver content. In addition, the loading of the silver catalyst on the monolith is significantly higher which penalizes the $Ag_2WO_4$ catalyst.

Figure 3:
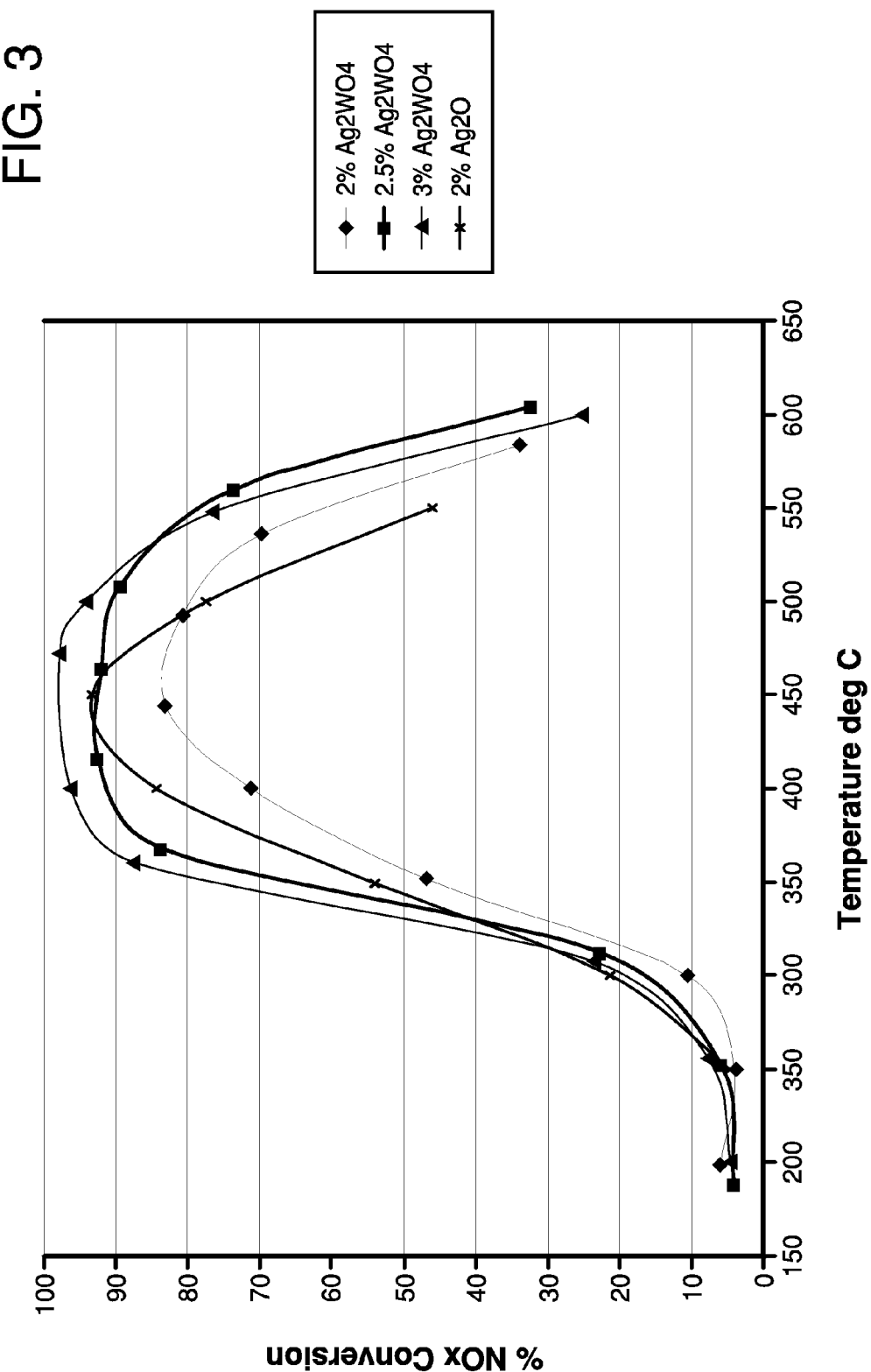
FIG. 3 is a graph showing NOx conversion of a silver catalyst to various silver tungstate catalysts.

FIG. 3 shows all four catalysts on the same graph. Despite the three silver tungstate samples all having less silver content than the silver catalyst, the performance of the 2.5 and 3.0% silver tungstate catalysts is clearly superior.

Example 2

$NO_x$ Activity of Silver Tungstate Using Diesel Fuel

Figure 4:
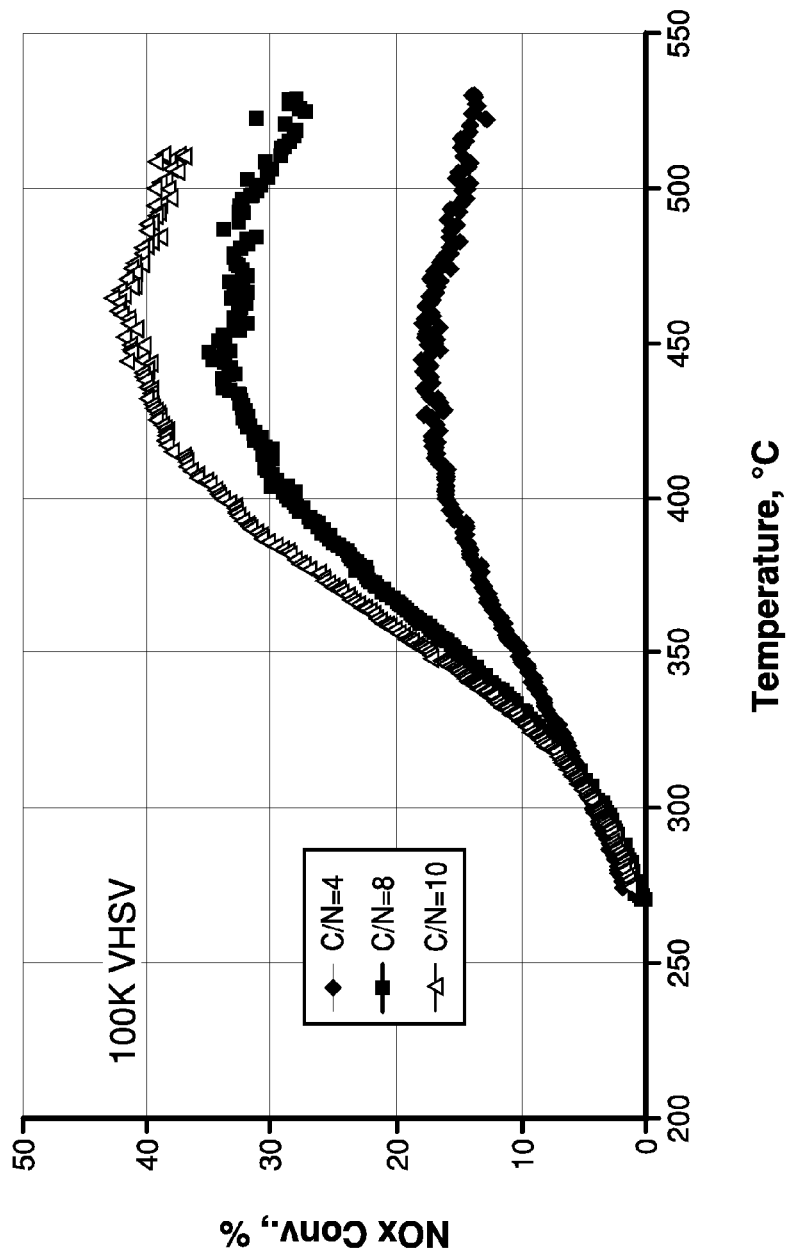
FIG. 4 is a graph showing the NOx conversion of silver tungstate catalyst used with a diesel fuel reductant.

A sample of 2% silver tungstate prepared from a pseudoboehmite support was coated onto a ¾ inch diameter by 1 inch cylindrical 300 cell per square inch cordierite monolith. The catalyst loading was 2 g/in³. The catalyst was treated in 10% steam in air at 550° C. for 24 hours. The $NO_x$ conversion at various temperatures was determined using a tubular laboratory reactor at 100,000 hr−1 space velocity with a gaseous feed stream containing 10% oxygen, 400 ppm NO and 8% water vapor. The reductant was ultra low sulfur #2 diesel fuel. The C1 to N ratio was varied as shown. The balance of the feed stream was nitrogen. FIG. 4 shows that silver tungstate is an effective NOx reduction catalyst.

Example 3

Catalysts containing either 1% $Ag_2O$ or 1% $Ag_2WO_4$ were made from various alumina supports as described above. Each catalyst was prepared from pseudoboehmite, boehmite and rehydrated flash calcined gibbsite. The materials were tested in the microchannel catalytic reactor as described above. As shown in the Table below, the 1% $Ag_2O$ and 1% $Ag_2WO_4$ catalysts have similar conversions on the same support. In two cases the silver tungstate catalyst has higher activity even though the silver content for the silver tungstate is ½ of the silver only catalyst. The surface areas listed in the Table are for the supports prior to the addition of silver compounds.

| Support | Catalyst | % $Ag_2O$ | Surface area m²/g | Maximum % $NO_x$ conversion |
|---|---|---|---|---|
| Crystalline boehmite | 1% $Ag_2O$ | 1 | 110 | 30.2 |
| Crystalline boehmite | 1% $Ag_2WO_4$ | 0.5 | 110 | 33.2 |
| Pseudoboehmite | 1% $Ag_2O$ | 1 | 270 | 39.2 |
| Pseudoboehmite | 1% $Ag_2WO_4$ | 0.5 | 270 | 44.8 |
| Rehydrated gibbsite | 1% $Ag_2O$ | 1 | 415 | 40.3 |
| Rehydrated gibbsite | 1% $Ag_2WO_4$ | 0.5 | 415 | 34.8 |

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed:

1. A catalyst for reducing NOx emissions from an exhaust gas stream of a lean burn engine comprising silver tungstate on an alumina support.

2. The catalyst of claim 1, wherein the silver tungstate comprises the stoichiometric compound $Ag_2WO_4$ or multiples thereof.

3. The catalyst of claim 1, wherein the ratio of $Ag_2O$ to $WO_3$ is between about 2:1 and 1:2.

4. The catalyst of claim 1, wherein the alumina is selected from hydroxylated aluminas such as boehmite, pseudo boehmite or gelatinous boehmite, diaspore, nordstrandite, bayerite, gibbsite, alumina having hydroxyl groups added to the surface and mixtures thereof.

5. A catalyst of claim 1 where the alumina is selected from calcined aluminas such as gamma, delta, theta, kappa and rho alumina.

6. An emissions treatment system for an exhaust stream comprising a catalyst according to claim 1.

7. The emissions treatment system of claim 6, wherein the catalyst is disposed on a ceramic or metallic honeycomb flow through substrate.

8. The emissions treatment system of claim 7, wherein the system includes a second catalyst disposed on a second ceramic or metallic honeycomb flow through substrate.

9. The emissions treatment system of claim 6, further comprising a component selected from diesel oxidation catalyst, a catalyzed soot filter, a soot filter, a NOx trap, partial hydrocarbon oxidation catalyst, a sulfur trap, a precious metal catalyst disposed on a substrate, a phosphorous trap, and combinations or one or more thereof.

10. The emissions treatment system of claim 6, wherein the catalyst is disposed on a soot filter and functions as a hydrocarbon SCR catalyst.

11. The emissions treatment system of claim 10 wherein the soot filter is a wall flow filter.

12. The emissions treatment system of claim 11 wherein the soot filter is a wall flow filter comprising an inlet end, an outlet end and internal walls extending from the inlet end to the outlet end and defining a plurality of passages comprising inlet channel sides and outlet channel sides with alternate channels comprising inlet channels having open inlets and plugged outlets and outlet channels having open outlets and plugged inlets, wherein the catalyst is disposed on the outlet channel side.

13. The emissions treatment system of claim 12 further comprising an NSR catalyst which extends from the inlet end for at least part of the distance from the open inlet toward the plugged outlet, and the SCR catalyst extends from the outlet end for at least part of the distance from the open outlet toward the plugged outlet.

14. The emission treatment system of claim 13 wherein there is an inlet oxidation catalyst disposed as a layer on part of the NSR catalyst and extends from the inlet end for at least part of the distance from the open inlet toward the plugged outlet, and/or there is an outlet oxidation catalyst disposed as a layer on part of the SCR catalyst and extends from the outlet end for at least part of the distance from the open outlet toward the plugged outlet.

* * * * *